3,753,959
Patented Aug. 21, 1973

3,753,959
ALTERNATING COPOLYMERS

Mitsuo Ichikawa, Yasumasa Takeuchi, Yoshiyuki Harita, and Masayuki Endo, Yokkaichi-shi, Mie-ken, Nobuo Yamaguchi, Mie-gun, Mieken, Mitsuru Tashiro, and Akira Kogure, Yokkaichi-shi, Japan, assignors to Japan Synthetic Rubber Co., Ltd., Tokyo, Japan
No Drawing. Filed Sept. 17, 1969, Ser. No. 858,860
Int. Cl. C08f 1/56, 19/10
U.S. Cl. 260—78.5 BB   32 Claims

ABSTRACT OF THE DISCLOSURE

The disclosure covers a novel process for making copolymers through the use of a novel combination of two catalyst components in particular an organo-aluminum compound and an organic compound having a labile halogen atom. The disclosure also covers novel alternate copolymers of conjugated dienes and conjugated heterodienes alone or together with monoolefines.

---

This invention relates to a process for the preparation of copolymers, in particular, alternate copolymers of conjugated dienes with conjugated heterodienes alone or together with monoolefins, and to such alternate copolymers.

By "conjugated heterodiene" is meant an organic compound containing two conjugated multiple bonds one of which is between a carbon atom and a non-metallic atom other than carbon, especially O, S and N.

Heretofore, free radical polymerization with various peroxides and other initiators has been commercially carried out for copolymerizing conjugated dienes with conjugated heterodienes, either alone or with monoolefins. However, such processes have not been successful in producing significant alternation in the repeating monomer residues. As a result the full potential of copolymerisation in this field has not previously been tested.

Japanese patent publication No. 10,996/1966 and Japanese patent publication No. 15,984/1968 disclose a process for preparing alternate copolymers of monoolefins with conjugated heterodienes in the presence of organoaluminum halides. However, the combinations of monomers used in this invention are not disclosed. When conjugated dienes and conjugated heterodienes are copolymerized in the presence of an organoaluminum halide, the copolymer is either not formed at all or the yield is so low that commercial production by this method is not feasible. Through the use of a novel catalyst combination the present inventors have found it possible to produce the copolymers.

According to one aspect of the present invention there is provided a process for preparing a binary copolymer described hereafter which comprises reacting two monomers selected from the group consisting of conjugated diene (D) hereafter defined and conjugated heterodiene (H) hereafter defined, in the presence of a catalyst component A and a catalyst component B.

According to another aspect of the invention there is provided a process for making a multi-component copolymer which is described hereafter and which comprises reacting at least three monomers selected from at least one conjugated diene (D), at least one conjugated heterodiene (H), and mono-olefin or derivative thereof (O) hereafter defined which optionally can be employed in the presense of a catalyst component A and a catalyst component B.

When one of these two catalyst components is absent, the copolymer has not been effectively produced.

CATALYST COMPONENT A

This is a compound of the formula:

$$R_a^1 M X_b^1 \quad (I)$$

Where m is an element of Groups II–B, III–A, and IV–A of the Periodic Table (e.g. as published by E. H. Sargent & Co. in U.S.A.);

$R^1$ is a member selected from the group consisting of alkyl, cycloalkyl, aryl and aralkyl;

$X^1$ is a member selected from the group consisting of hydrogen, halogen and $OR^{11}$, where $R^{11}$ is a member selected from the group as defined in R above, and a and b are positive numbers and one of them may be zero, and the sum of a and b is equivalent to the value of valency of the element M.

The element M is preferably zinc, cadmium, mercury, boron, aluminum, tin or lead.

$R^1$ may for example be methyl, ethyl, propyl, butyl, cyclohexyl, phenyl or benzyl.

$X^1$ may for example be hydrogen or halogen.

$R^{11}$ may for example be methyl, ethyl, isopropyl, butyl, phenyl or benzyl.

As representative examples of the catalyst component A there may be mentioned diethyl zinc, diisobutyl zinc, zinc chloride diethyl cadmium, cadmium chloride, diethyl mercury, diphenyl mercury, mercuric chloride, triethyl boron, tributyl boron, triphenyl boron, diethyl boron chloride, dibutyl boron chloride, diethyl boron bromide, diethyl boron hydride, diphenyl boron hydride, phenyl boron dichloride, boron trichloride, boron trifluoride, triethylaluminum, triisobutylaluminum, triphenylaluminum, triisopropoxyaluminum, diethylaluminum chloride, diethylaluminum bromide, diethylaluminum fluoride, diethylaluminum methoxide, diethylaluminum ethoxide, diethylaluminum hydride, diphenylaluminum hydride, ethylaluminum sesquichloride, ethylaluminum sesquibromide, ethylaluminum dichloride, isobutylaluminum dichloride, ethylaluminum dibromide, ethylaluminum diethoxide, aluminum chloride, aluminum bromide, tetraethyl tin, tetrabutyl tin, tetraphenyl tin, triethyl tin chloride, diethyl tin dichloride, ethyl tin trichloride, tin chloride and tetraethyl lead.

Particularly preferred are organoaluminum compound and organoboron compound.

These compounds may be used singly or as a mixture to constitute catalyst component A. As examples of combination of two compounds, there may be mentioned triethyl aluminum-aluminum chloride, diethylaluminum chloride-ethylaluminum dichloride, triethylaluminum-boron fluoride, triethylaluminum-tin tetrachloride, triethyl boron-aluminum bromide, triethyl boron-boron chloride, and diethyl zinc-boron chloride.

CATALYST COMPONENT B

This is an organic compound containing a labile halogen atom of the formula:

(II)

where:

$X^2$ is halogen or hydrogen;

$Q^1$ and $Q^2$ are similar or dissimilar and are selected from the group consisting of hydrogen, halogen, alkyl, aryl and aralkyl;

$Q^3$ is selected from the group consisting of hydrogen, halgoen, alkyl, aryl, aralkyl, —$OR^{21}$, —$SR^{22}$, —CN, —$NR^{23}R^{24}$, —$CONR^{25}R^{26}$,

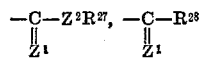

(where $Z^1$ and $Z^2$ are similar or dissimilar, and are selected from the group consisting of oxygen and sulfur and where $R^{21}$, $R^{22}$, $R^{23}$, $R^{24}$, $R^{25}$, $R^{26}$ and $R^{27}$ are similar or dissimilar and are selected from the group consisting of hydrogen, alkyl, cycloalkyl, aryl and aralkyl and where $R^{28}$ is halogen, ore one of the groups as defined in $R^{21}$ above).

In the definition above of catalyst component B the words alkyl, aryl and aralkyl include substituted groups and the word alkyl includes alkenyl, e.g. allyl.

In particular, $Q^3$ may be selected from the group consisting of alkyl, aryl and aralkyl containing a member of the group consisting of halogen $OR^{21}$, $SR^{22}$, CN, $NR^{23}R^{24}$,

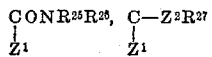

and C—$R^{28}$ as a substituent.

As representative examples of catalyst component B, there may be mentioned halogenated hydrocarbons such as carbon tetrachloride, chloroform, tert-butyl chloride, benzyl chloride, dichloromethylbenzene, 1-chlorobutene-2; 1,4-dechlorobutene-2,3-chloropropene and the like; halogenated organic acids such as trichloroacetic acid, dichloracetic acid, monochloroacetic, acid, tribromoacetic acid, trifluoroacetic acid, and the like; halogenated organic acid esters such as trichloracetic acid esters, for example ethyl trichloracetate, tribromoacetic acid esters, trifluoroacetic acid esters and the like; acid halides such as acetylchloride, benzoylchloride, and the like; halogenated aldehydes such as trichloracetaldehyde, tribromoacetaldehyde and the like; halogenated alcohols such as trichloroethylalcohol and the like; and halogenated ethers such as trichloroethyl ether and the like.

THE CONJUGATED DIENES (D)

The conjugated dienes used in this invention are preferably those having 4 to 12 carbon atoms whcih may be of straight chain, branched chain and ring form. Representative conjugated dienes are straight chain conjugated dienes such as btuadiene, pentadiene, hexadiene, heptadiene, octadiene and the like; branched chain conjugated dienes such as isoprene, 2-ethylbutadiene, 2-tert-butyl-butadiene, 3-methylheptatriene-1,4,6 and the like; and cyclic conjugated dienes such as cyclohexadiene, cyclopentadiene and the like, and substituted conjugated dienes such as chloroprene. Particularly preferred are butadiene, isoprene, pentadiene and chloroprene.

THE CONJUGATED HETERODIENES (H)

The conjugated heterodienes used in this invention may include those represented by the following formulae:

 (III)

 (IV)

 (V)

where:

$R^3$, $R^4$, $R^5$, $R^6$, $R^7$ and $R^8$ are similar or dissimilar and are selected from the group consisting of hydrogen, halogen, nitrile, carboxyl, a hydrocarbon group containing 1 to 12 carbon atoms and a substituted hydrocarbon group containing 1 to 12 carbon atoms;

Y is selected from the group consisting of hydrogen, halogen, $OR^{31}$, $SR^{32}$, $NR^{33}R^{34}$ (where $R^{31}$, $R^{32}$, $R^{33}$ and $R^{34}$ are similar or dissimilar and are selected from the group consisting of hydrogen and a hydrocarbon group containing 1 to 12 carbon atoms), and a hydrocarbon group of 1 to 12 carbon atoms and acid anhydride of the above-mentioned compounds where these are organic acids.

Representative of the conjugated dienes are acrylic acid; acrylic acid esters such as methyl acrylate, ethyl acrylate, butyl acrylate, octyl acrylate and the like; acrylic acid halides such as acryloyl chloride and the like; acrylamide and derivates thereof; thionylacrylic acid ($CH_2$=CH—CS—OH) and its derivatives such as methyl thionylacrylate and the like; thiolacrylic acid $$(CH_2=CH-CO-SH)$$

and its derivatives such as methyl thiolacrylate and the like; methacrylic acid, methacrylic acid esters such as methyl methacrylate, ethyl methacrylate, butyl methacrylate, octyl methacrylate and the like; methacrylamide, crotonic acid; crotonic acid esters such as methyl crotonate and the like; cinnamic acid; cinnamic acid esters such as methyl cinnamate and the like; maleic acid; maleic anhydride; maleic acid esters; fumaric acid; itaconic acid; acrolein; methacrolein; vinyl ketones such as methyl vinyl ketone; methyl isopropenyl ketone and the like; nitriles such as acrylonitrile; chloroacrylonitrile; methacrylonitrile; vinylidene cyanide and the like.

Among the above compounds, acrylonitrile, methacrylonitrile, methyl acrylate, methyl methacrylate, butyl methacrylate and maleic anhydride are particularly preferred.

THE MONOOLEFINS (O)

The monoolefins used in this invention are preferably those containing 2 to 12 carbon atoms. Representative monoolefins are aliphatic straight chain or branched chain olefins such as ethylene, propylene, butene-1, butene-2, isobutene, pentene-1, pentene-2, 2-methylbutene-1, 3-methylbutene-1, 2-methylbutene-2, hexene-1, hexene-2, 2-methylpentene-1, dodecene and the like; aliphatic cyclic (including bridge or aromatic fused ring) olefins such as cyclobutene, cyclopentene, cyclooctene, norbornene, indene and the like; esters of unsaturated alcohols such as vinyl acetate, vinyl propionate and the like; unsaturated aralkyl compounds such as styrene and substituted styrenes, vinyl naphthalene and vinyl carbazole; and halogen substituted olefins such as vinyl chloride, vinylidene chloride and the like.

The catalyst components may be used in an optional ratio with respect to the monomers. In general it is preferable to use 0.0001 to 10 moles of catalyst (based on catalyst component A) per one mole of a conjugated heterodiene, particularly preferred is a ratio of 0.0015 to 5 moles catalyst per mole of conjugated heterodiene.

The ratio of catalyst component B to catalyst component A may be optionally selected. The ratio is preferably 0.05 to 20 moles (particularly 0.1 to 10 moles) of catalyst component B per mole of catalyst component A.

The process of this invention may be effected in the presence or absence of solvent. As the solvent, hydrocarbon solvents or halogenated hydrocarbon solvents may be used. As hydrocarbon solvents, there may be mentioned, for example, aliphatic hydrocarbons such as pentane, hexane, heptane, octane and the like; aromatic hydrocarbons such as benzene, toluene and the like; and alicyclic hydrocarbons such as cyclohexane and the like.

As halogenated hydrocarbons, there may be mentioned, for example, solvents inert to catalyst component A such as methylene chloride, tetrachloroethylene, chlorobenzene, dichlorobenzene and the like.

These solvents prevent an undue increase in viscosity during polymerization and are effective to carry out (MMA). Elementary analysis of the rubber-like copolymer obtained in Example 48 shows that the copolymer contains the methyl methacrylate unit of 45% which corresponds to 1:1 copolymer.

The elementary analysis of the copolymer obtained in Example 56 gives N=4.32% and O=11.88% while the calculated value at the bonding ratio of butadiene:acrylonitrile:methyl methacrylate=2:1:1 is N=5.36% and O=11.69%.

TABLE 10

| | Catalyst, mmol | | Monomer, mole | | Solvent | Amount, ml. | Polymerization temperature, °C. | Yield, g. | Conversion, percent |
|---|---|---|---|---|---|---|---|---|---|
| | AlEt₃ | CCl₃COOH | BD | MMA | | | | | |
| Control | 5.0 | 0 | 0 | 0.1 | Toluene | 85 | 40 | | 0 |
| Example: | | | | | | | | | |
| 44 | 5.0 | 2.5 | 0.1 | 0.1 | ___do___ | 23 | 40 | 3.0 | 20 |
| 45 | 5.0 | 5.0 | 0.1 | 0.1 | CH₂Cl₂ | 20 | 40 | 3.03 | 20 |
| 46 | 5.0 | 2.5 | 0.1 | 0.1 | CH₂Cl₂ | | 40 | 7.85 | 51 |
| 47 | 5.0 | 5.0 | 0.1 | 0.1 | CH₂Cl₂ | 20 | 70 | 11.60 | 75 |
| 48 | 5.0 | 5.0 | 0.1 | 0.1 | CH₂Cl₂ | | 70 | 14.13 | 92 |

Examples 49–52

The results of various combinations of butadiene and methyl acrylate (MA) are shown in Table 11.

TABLE 11

| Example | Catalyst, mmol | | Monomer, mole | | Solvent | Amount, ml. | Polymerization temperature, °C. | Yield, g. | Conversion, percent |
|---|---|---|---|---|---|---|---|---|---|
| | AlEt₃ | CCl₃COOH | BD | MA | | | | | |
| 49 | 5.0 | 5.0 | 0.1 | 0.1 | Toluene | 25 | 40 | 0.28 | 2.0 |
| 50 | 5.0 | 2.5 | 0.1 | 0.1 | ___do___ | | 70 | 2.50 | 18 |
| 51 | 5.0 | 5.0 | 0.1 | 0.1 | CH₂Cl₂ | | 40 | 0.53 | 3.7 |
| 52 | 5.0 | 5.0 | 0.1 | 0.1 | Heptane | 22 | 70 | 2.55 | 18 |

Therefore, is is clear that bonding ratio of the resulting copolymer is 2:1:1.

TABLE 12

| | Catalyst, mmol | | Monomer, mmol | | | Solvent | Amount, ml. | Yield, g. | Conversion, percent |
|---|---|---|---|---|---|---|---|---|---|
| | AlEt₃ | CCl₃COOH | BD | AN | MMA | | | | |
| Example: | | | | | | | | | |
| 53 | 5 | 1.25 | 100 | 50 | 50 | Toluene | 26 | 4.41 | 33.7 |
| 54 | 5 | 5 | 100 | 50 | 50 | ___do___ | 22 | 8.58 | 65.7 |
| 55 | 5 | 7.5 | 100 | 50 | 50 | ___do___ | 20 | 9.54 | 73.0 |
| Control | 5 | 0 | 100 | 50 | 50 | ___do___ | 29 | 0.03 | 0.2 |
| Example: | | | | | | | | | |
| 56 | 5 | 5 | 100 | 50 | 50 | Heptane | 22 | 10.74 | 82.2 |
| 57 | 5 | 5 | 100 | 50 | 50 | Methylene chloride | 22 | 7.06 | 54.0 |

Examples 53–57

Table 12 illustrates the results of copolymerization of butadiene (BD), acrylonitrile (AN), and methyl methacrylate (MMA) at 70° C.

Examples 58–63

The procedure in Examples 53–57 is repeated by using butadiene (BD) and acrylonitrile (AN) at 70° C. The result is shown in Table 13.

TABLE 13

| | Catalyst, mmol | | Monomer, mmol | | | Solvent | Amount, ml. | Yield, g. | Conversion, percent |
|---|---|---|---|---|---|---|---|---|---|
| | AlEt₃ | CCl₃COOH | BD | IB | AN | | | | |
| Example 58 | 5 | 7.5 | 50 | 50 | 100 | Toluene | 21 | 7.49 | 69.2 |
| Control | 5 | 0 | 50 | 50 | 100 | ___do___ | 29 | 0.98 | 9.1 |
| Example: | | | | | | | | | |
| 59 | 5 | 7.5 | 50 | 50 | 100 | Methylene chloride | 21 | 4.70 | 43.5 |
| 60 | 5 | 1.25 | 50 | 50 | 100 | Heptane | 28 | 5.90 | 54.5 |
| 61 | 5 | 2.5 | 50 | 50 | 100 | ___do___ | 27 | 4.79 | 44.3 |
| 62 | 5 | 5 | 50 | 50 | 100 | ___do___ | 24 | 7.58 | 70.1 |
| 63 | 5 | 7.5 | 50 | 50 | 100 | ___do___ | 21 | 8.80 | 81.4 |

| | Catalyst, mmol | | Monomer | | | Solvent | Yield, g. | Conversion, percent | Elementary analysis, percent | | | |
|---|---|---|---|---|---|---|---|---|---|---|---|---|
| | | | Conjugated diene | Olefin | Conjugated vinyl compound | | | | Found | | Calculated | |
| | AlEt₃ | CCl₃COOH | | | | | | | N | O | N | O |
| Example: | | | | | | | | | | | | |
| 64 | 5.0 | 5.0 | BD | ST | AN | Toluene | 9.52 | 72 | 7.28 | | 10.61 | |
| 65 | 5.0 | 5.0 | BD | ST | AN | Heptane | 11.35 | 86 | 8.96 | | 10.61 | |
| 66 | 5.0 | 5.0 | BD | ST | AN | Methylene chloride | 10.00 | 76 | 7.30 | | 10.61 | |
| 67 | 5.0 | 5.0 | IP | ST | AN | Toluene | 8.9 | 64 | 7.13 | | 10.07 | |
| 68 | 5.0 | 5.0 | IP | ST | AN | Heptane | 2.9 | 20 | 8.90 | | 10.07 | |
| 69 | 5.0 | 5.0 | BD | ST | MMA | Toluene | 17.40 | 97 | | 15.95 | | 17.88 |
| 70 | 5.0 | 5.0 | BD | ST | MMA | Heptane | 15.4 | 86 | | 16.75 | | 17.88 |
| 71 | 5.0 | 5.0 | BD | ST | MMA | Methylene chloride | 18.2 | 100 | | 19.84 | | 17.88 |
| 72 | 5.0 | 5.0 | IP | ST | MMA | Toluene | 17.4 | 93 | | 15.95 | | 17.20 |
| 73 | 5.0 | 5.0 | IP | ST | MMA | Methylene chloride | 17.3 | 93 | | 16.70 | | 17.20 |
| Control | 5.0 | 0 | | | | Toluene | 0 | 0 | | | | |
| Do | 5.0 | 0 | BD 0.1 | ST 0.1 | 0 | ___do___ | 0 | 0 | | | | |
| Do | 5.0 | 0 | BD 0.1 | 0 | MMA 0.1 | ___do___ | 0 | 0 | | | | |

TABLE 4

| Ex. | Catalyst, mmol | | Monomer, mole | | Solvent, toluene, ml. | Yield, g. | Conversion, percent | N content, percent |
|---|---|---|---|---|---|---|---|---|
| | AlEt₃ | CCl₃COOH | AN | BD | | | | |
| 15 | 5.0 | 5.0 | 0.1 | 0.1 | 10 | 7.31 | 73 | 9.20 |
| 16 | 5.0 | 5.0 | 0.15 | 0.1 | 10 | 8.86 | 83 | 10.76 |
| 17 | 5.0 | 5.0 | 0.20 | 0.1 | 10 | 9.55 | 89 | 11.14 |
| 18 | 5.0 | 5.0 | 0.25 | 0.1 | 10 | 9.80 | 92 | 11.24 |
| 19 | 5.0 | 5.0 | 0.30 | 0.1 | 10 | 8.62 | 81 | 12.28 |
| 20 | 5.0 | 5.0 | 0.35 | 0.1 | 10 | 7.95 | 74 | 12.16 |

Examples 21–23

The procedure of Example 1 is repeated in the presence of AlEt₃-CCl₃COOH system by charging the kind of solvent at 70° C. The result is shown in Table 5 below.

TABLE 5

| Example | Catalyst, mmol | | Monomer, mole | | Table solvent | Amount | Yield, g. | Conversion, percent |
|---|---|---|---|---|---|---|---|---|
| | AlEt₃ | CCl₃COOH | AN | BD | | | | |
| 21 | 5.0 | 6.25 | 0.1 | 0.1 | Toluene | 237 | 2.78 | 26.0 |
| 22 | 5.0 | 5.0 | 0.1 | 0.1 | Methylene chloride | 25 | 2.78 | 26.0 |
| 23 | 5.0 | 5.0 | 0.1 | 0.1 | Heptane | 25 | 10.07 | 94.0 |

Examples 24–27

The procedure of Example 21 is repeated with verying amount of catalyst and the result is shown in Table 6 below.

TABLE 6

| Example | Catalyst, mmol | | Monomer, mole | | Solvent, toluene, ml. | Yield, g. | Conversion, percent |
|---|---|---|---|---|---|---|---|
| | AlEt₃ | CCl₃COOH | AN | BD | | | |
| 21 | 5.0 | 6.25 | 0.1 | 0.1 | 23 | 2.78 | 26 |
| 24 | 5.0 | 5.0 | 0.1 | 0.1 | 25 | 2.50 | 24 |
| 25 | 5.0 | 3.75 | 0.1 | 0.1 | 27 | 1.78 | 17 |
| 26 | 2.5 | 2.5 | 0.1 | 0.1 | 30 | 0.8 | 7.5 |
| 27 | 10.0 | 10.0 | 0.1 | 0.1 | 15 | 2.4 | 22.5 |

Examples 28–40

The procedure of Example 1 is repeated by using various organic halogen compounds in place of trichoroacetic acid as component B of catalyst. In Examples 33 and 34, the solvent is different from that of Example 32. In Examples 39 to 40, the polymerization temperature is 70° C. (40° C. in other examples). The result is shown in Table 7.

Examples 41 and 42

In Examples 28–40, the component B is varied, but in the present examples the component A is varied and the temperature is 70° C. The result is shown in Table 8.

TABLE 8

| | Catalyst | | | Monomer, mole | | Solvent, ml. toluene | Yield, g. | Conversion, percent |
|---|---|---|---|---|---|---|---|---|
| | Component A | Mmol | CCl₃COOH, mmol | BD | AN | | | |
| Control | ZnEt₂ | 5.0 | 0 | 0.1 | 0.1 | 30 | 0.65 | 6 |
| Example: | | | | | | | | |
| 41 | ZnEt₂ | 5.0 | 2.5 | 0.1 | 0.1 | 27 | 1.58 | 15 |
| 42 | SnBu₄ | 5.0 | 7.5 | 0.1 | 0.1 | 22 | 0.22 | 2 |

Example 43

Examples up to Example 42 refer mainly to a copolymerization system comprising butadiene and acrylonitrile, but the present Example 43 refer to a copolymerization system containing isoprene (IP) in place of butadiene. The result is shown in Table 9.

TABLE 9

| | Catalyst, mmol | | Monomer, mole | | Solvent, CH₂Cl₂, ml. | Polymerization temperature, °C. | Yield, g. | Conversion, percent |
|---|---|---|---|---|---|---|---|---|
| | AlEt₃ | CCl₃COOH | IP | AN | | | | |
| Control | 5.0 | 0 | 0.1 | 0 | 35 | 40 | | 0 |
| Example 43 | 5.0 | 5.0 | 0.1 | 0.1 | 25 | 40 | 2.76 | 22.8 |

Examples 44–48

Table 10 illustrates the results obtained by using the system comprising butadiene and methyl methacrylate

TABLE 7

| Example | Catalyst | | | | Monomer, mole | | Solvent | Amount, ml. | Yield, g. | Conversion, percent |
|---|---|---|---|---|---|---|---|---|---|---|
| | Component A | Amount, mmol | Component B | Amount, mmol | AN | BD | | | | |
| 28 | AlEt₃ | 5 | t-BuCl | 10 | 0.05 | 0.05 | Toluene | 31 | 0.22 | 4.1 |
| 29 | AlEt₂Cl | 5 | t-BuCl | 5 | 0.05 | 0.05 | do | 36 | 0.30 | 5.6 |
| 30 | AlEt₁.₅Cl₁.₅ | 5 | t-BuCl | 5 | 0.05 | 0.05 | do | 36 | 0.50 | 9.3 |
| 31 | AlEt₂Cl | 5 | PhCH₂Cl | 10 | 0.05 | 0.05 | do | 31 | 0.80 | 15.0 |
| 32 | AlEtCl₂ | 5 | PhCH₂Cl | 5 | 0.05 | 0.05 | do | 36 | 0.90 | 16.5 |
| 33 | AlEtCl₂ | 5 | PhCH₂Cl | 20 | 0.05 | 0.05 | Methylene chloride | 21 | 1.41 | 26.0 |
| 34 | AlEtCl₂ | 5 | PhCH₂Cl | 20 | 0.05 | 0.05 | Heptane | 21 | 1.81 | 33.5 |
| 35 | AlEtCl₂ | 5 | CCl₄ | 1.25 | 0.05 | 0.05 | Toluene | 39.75 | 0.27 | 5.0 |
| 36 | AlEt₁.₅Cl₁.₅ | 5 | CCl₄ | 2.5 | 0.05 | 0.05 | do | 38.5 | 1.21 | 22.5 |
| 37 | AlEtCl₂ | 5 | CCl₃CHO | 2.5 | 0.05 | 0.05 | do | 38.5 | 1.20 | 22.0 |
| 38 | AlEt₂.₅Cl₂.₅ | 5 | CCl₃CHO | 5 | 0.05 | 0.05 | do | 36 | 0.66 | 12.0 |
| 39 | AlEt₃ | 5 | CHCl₂COOH | 5 | 0.1 | 0.1 | do | 25 | 0.22 | 2.0 |
| 40 | AlEt₃ | 5 | CH₂ClCOOH | 7.5 | 0.1 | 0.1 | do | 23 | 2.50 | 24.0 | plastics have been used. Furthermore, it is possible to apply the novel copolymers to new fields where their particular characteristics can be effectively utilized.

The following examples are given for illustrating the present invention, but not for limiting the scope of this invention.

Examples 1–5

A 100 ml. ampoule is dried sufficiently, and nitrogen gas is substituted several times. Then, according to the formulation of Table 1 below, there are added to the ampoule a dried solvent at 10° C., a molar solution of an organoaluminum compound (as catalyst component A) in a solvent, a molar solution of trichloroacetic acid (as catalyst component B) in a solvent, butadiene and acrylonitrile. The ampoule is, then, immediately sealed. All the procedures as above are carried out in a nitrogen atmosphere.

The ampoule is rotated in a rotating polymerization vessel at 40° C. to effect the copolymerization. The ampoule is opened after 18 hours and then a small amount of phenyl-β-naphthylamine is added thereto and mixed thoroughly to stop the copolymerization. The reaction mixture is poured into a hydrochloric acid-methanol solution containing phenyl-β-naphthylamine to decompose and dissolve the catalyst and simultaneously the resulting copolymer is precipitated. The precipitated copolymer is separated and washed several times with methanol containing phenyl-β-naphthylamine and dried at 40° C. under reduced pressure overnight. The result is shown in Table 1 below.

TABLE 1

| | Catalyst | | CCl$_3$COOH, mmol | Monomer, mmol | | Solvent, toluene, ml. | Yield, g. | Conversion, percent |
|---|---|---|---|---|---|---|---|---|
| | Component A | Mmol | | BD | AN | | | |
| Control | AlEt$_3$ | 5 | 0 | 50 | 50 | 36 | 0.08 | 1.5 |
| Example 1 | AlEt$_3$ | 5 | 5 | 50 | 50 | 31 | 0.22 | 4.1 |
| Control | AlEt$_3$ | 5 | 0 | 50 | 50 | 36 | Trace | |
| Example 2 | AlEt$_3$ | 5 | 5 | 50 | 50 | 31 | 0.3 | 5.6 |
| Control | AlEt$_{1.5}$Cl$_{1.5}$ | 5 | 0 | 50 | 50 | 36 | 0.01 | 0.2 |
| Example 3 | AlEt$_{1.5}$Cl$_{1.5}$ | 5 | 5 | 50 | 50 | 31 | 0.48 | 9.0 |
| Control | AlEtCl$_2$ | 5 | 0 | 50 | 50 | 36 | 0.06 | 1.1 |
| Example 4 | AlEtCl$_2$ | 5 | 5 | 50 | 50 | 31 | 0.21 | 3.9 |
| Control | AlEt$_2$(OEt) | 5 | 0 | 50 | 50 | 36 | Trace | |
| Example 5 | AlEt$_2$(OEt) | 5 | 5 | 50 | 50 | 31 | 0.64 | 12.0 |

NOTE.—Et denotes ethyl, BD butadiene, AN acrylonitrile.

As one example of analysis of the resulting copolymer, N% of the copolymer obtained in Example 3 above is 11.02% and this shows that the copolymer of butadiene and acrylonitrile is highly alternate copolymer.

Examples 6–11

The product of Example 1 is repeated at 70° in place of 40° C. The result is shown in Table 2.

TABLE 2

| | Catalyst | | CCl$_3$COOH, mmol | Monomer, mmol | | Solvent, toluene, ml. | Yield, g. | Conversion, percent |
|---|---|---|---|---|---|---|---|---|
| | Component A | Mmol | | BD | AN | | | |
| Control | AlEt$_3$ | 5 | 0 | 100 | 0 | 36 | 0 | 0 |
| Do | AlEt$_3$ | 5 | 0 | 0 | 100 | 36 | 0.05 | 0.9 |
| Do | AlEt$_3$ | 5 | 0 | 50 | 50 | 32 | 0.5 | 9.3 |
| Example 6 | AlEt$_3$ | 5 | 5 | 50 | 50 | 27 | 3.77 | 70.0 |
| Control | AlEt$_2$Cl | 5 | 0 | 50 | 50 | 32 | 0.01 | 0.2 |
| Example 7 | AlEt$_2$Cl | 5 | 5 | 50 | 50 | 27 | 0.32 | 6.0 |
| Control | AlEt$_{1.5}$Cl$_{1.5}$ | 5 | 0 | 50 | 50 | 32 | 0.03 | 0.6 |
| Example 8 | AlEt$_{1.5}$Cl$_{1.5}$ | 5 | 5 | 50 | 50 | 27 | 0.67 | 12.5 |
| Control | AlEtCl$_2$ | 5 | 0 | 50 | 50 | 32 | 0.10 | 1.8 |
| Example 9 | AlEtCl$_2$ | 5 | 5 | 50 | 50 | 27 | 1.52 | 8.0 |
| Control | AlEt$_2$(OEt) | 5 | 0 | 50 | 50 | 32 | Trace | |
| Example: | | | | | | | | |
| 10 | AlEt$_2$(OEt) | 5 | 5 | 50 | 50 | 27 | 1.45 | 27.0 |
| 11 | Al(iBu)$_3$ | 5 | 5 | 100 | 100 | 25 | 1.42 | 13.3 |

NOTE.—Bu is butyl.

Examples 12–14

The procedure of Example 1 is repeated by varying the ratio of butadiene and acrylonitrile at 60° C. When butadiene alone is used, the polymerization hardly proceeds and also when acrylonitrile alone is used, a powder polymer is obtained at low yield. The results are shown in Table 3. The catalyst is very active in copolymerization systems.

TABLE 3

| | Catalyst, mmol | | Monomer, mole | | Solvent, toluene, ml. | Yield, g. | Conversion, percent |
|---|---|---|---|---|---|---|---|
| | AlEt$_3$ | CCl$_3$COOH | AN | BD | | | |
| Control | 5.0 | 5.0 | 0 | 0.2 | 22 | 0.05 | 1 |
| Example: | | | | | | | |
| 11 | 5.0 | 5.0 | 0.05 | 0.15 | 23 | 1.72 | 16 |
| 12 | 5.0 | 5.0 | 0.10 | 0.10 | 25 | 2.52 | 23 |
| 13 | 5.0 | 5.0 | 0.15 | 0.05 | 25 | 2.53 | 24 |
| Control | 5.0 | 5.0 | 0.20 | 0 | 27 | 0.97 | 9.1 |

Examples 15–20

The procedure of Examples 12 to 14 is repeated except that the ratio of butadiene to acrylonitrile is changed and the copolymerization temperature is 70° C. The result is shown is Table 4. The conversion (percent) in the table is that for the ratio of butadiene to acrylonitrile of 1:1. In spite of the remarkable increase in acrylonitrile charged, that the bonding ratio of butadiene to acrylonitrile is almost 1:1.

smooth polymerization. It is also possible to use an excess of a monomer itself as a solvent.

The polymerization temperature is not critical but it is preferable to effect the polymerization within a temperature range of from −80° C. to 150° C.

Neither is the reaction pressure critical, to the extent that the reaction mixture can be retained in a liquid state under pressure if necessary or desired.

The polymerization reaction is preferably carried out in an inert gas atmosphere. After the completion of the polymerization reaction, the product may be recovered by conventional methods.

Further, by the present invention there is provided an alternate copolymer comprising at least two residues of monomers selected from the group consisting of conjugated diene (D) and conjugated heterodiene (H). (The residues of the respective monomers being designated D and H) wherein any one of residue of D and H is linked to the other type of residue H and D, respectively. Furthermore, by the present invention there is provided an alternate copolymer comprising at least one residue of conjugated dienes (D), at least one residue of conjugated heterodienes (H) and at least one residue of monoolefines or derivatives thereof (O) in which the repeating unit comprises two types of residues, one type being residue H and the other type being residue D or O, wherein a residue of any one of the types is linked to a residue of the other type. The invention includes both random sequences and specific chain sequences such as $$D-H-D-H'-D-H-D-H' \quad (1)$$
$$D-H-O-H'-D-H-D-H' \quad (2)$$

The combination of monomers employed in this invention is a combination of two or more members selected from the class consisting of conjugated dienes (D) and conjugated heterodienes (H) or a combination of monoolefins (O) and the above-mentioned combination. In other words, when a monoolefin is used at least one conjugated diene and at least one conjugated heterodiene must be combined with it.

More than one compound from any one of the three general types may be used in any one copolymer. For example the combinations of monomers reacted may include:

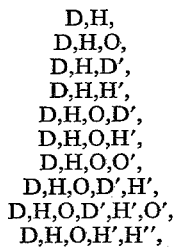

Representative combinations are as follows:

BINARY COPOLYMER

Butadiene-acrylonitrile
Butadiene-methyl methacrylate
Butadiene-methyl acrylate
Butadiene-acrolein
Butadiene-chloroprene
Isoprene-acrylonitrile
Isoprene-methyl methacrylate
Isoprene-methyl acrylate
Isoprene-acrolein
Pentadiene-acrylonitrile
Pentadiene-methyl methacrylate
Pentadiene-methyl acrylate
Pentadiene-acrolein
Cyclopentadiene-acrylonitrile
Acrylonitrile—methacrylic acid
Acryonitrile-acrolein

TERNARY COPOLYMER

Butadiene-acrylonitrile-methyl methacrylate
Butadiene-acrylonitrile-styrene
Butadiene-acrylonitrile-isobutene
Butadiene-acrylonitrile-butene-1
Butadiene-acrylonitrile-acrolein
Butadiene-methyl methacrylate-styrene
Butadiene-methyl methacrylate-isobutene
Butadiene-methyl methacrylate-butene-1
Butadiene-isoprene-acrylonitrile
Butadiene-isoprene-methyl methacrylate
Butadiene-chloroprene-acrylonitrile
Butadiene-chloroprene-methacrylic acid
Butadiene-pentadiene-acrylonitrile
Butadiene-pentadiene-methyl methacrylate
Butadiene-maleic anhydride-acrylonitrile
Butadiene-maleic anhydride-methacrylonitrile
Butadiene-maleic anhydride-butene-1
Butadiene-maleic anhydride-isobutene
Isoprene-acrylonitrile-methyl methacrylate
Isoprene-acrylonitrile-styrene
Isoprene-acrylonitrile-isobutene
Isoprene-methyl methacrylate-styrene
Isoprene-methyl methacrylate-isobutene
Isoprene-maleic anhydride-acrylonitrile
Isoprene-maleic anhydride-methacrylonitrile
Isoprene-maleic anhydride-butene-1
Isoprene-maleic anhydride-isobutene.

When the catalyst system of this invention is applied to only one monomer of the types described, the polymer is hardly obtained, or even if some amount of polymer is obtained, the polymerization activity is usually not significant and the yield is poor. On the other hand, when the monomers are used in combination as described, the polymerization activity is remarkably increased and the copolymer is produced in good yield.

This invention also provides processes for producing such alternate copolymers. The mechanism is believed to depend on the fact that a monomer coordinated to the catalyst reacts sparingly with the same kind of monomer, but easily reacts with a different one of the monomer types and the reaction is accelerated by adding the other types of monomer. However, this invention should not be understood as being restricted by the theoretical mechanism. The state of bonding of the monomer units in the copolymer produced by the process of this invention varies depending upon the combination of catalyst components, the combination of monomers, and the polymerization conditions, for example, as illustrated in Formulas 1 and 2 above. As shown in the examples below, some copolymers obtained by the process of this invention contain the monomer units in an alternate bonding state of almost 1:1 or at least in a highly alternate bonding state, regardless of the degree of polymerization.

Even when the ratio of monomers used in the original feed is not 1:1 in the case of some binary copolymer, the ratio of monomer units in the resulting copolymer is almost 1:1, and in a similar way, some ternary copolymer containing a constant ratio of monomer units can be obtained. Excess of conjugated heterodiene monomer charged to the copolymerization system will in general act simply as solvent and can be used for this purpose. The effect of the excess monomer is in general to raise catalyst activity, increase the molecular weight of the resulting copolymer, and to form the alternate copolymer more effectively.

The copolymers obtained by the process of this invention are novel and a feature of this invention is to provide such novel copolymers.

The novel alternate copolymers obtained according to this invention can be of high molecular weight, and their properties range from rubber-like to plastic depending upon the combination of monomers used. The preferred novel copolymers have particularly good strength and can be used in various fields where conventional rubber and

| Example | Catalyst, mmol Component A, AlEt₃ | Component B, CCl₃COOH | Monomer (the unit of the numeral is millimole unless otherwise specified) | Solvent ml. (toluene unless otherwise specified) | Reaction time, hr. | Polymerization temp., °C | Yield, g. | Conversion, percent | State | Note |
|---|---|---|---|---|---|---|---|---|---|---|
| 74 | 5.0 | 2.5 | BD, 50; IP, 50; AN, 100 | 27 | 18 | 70 | 4.25 | | Rubber like | N=9.54% |
| 75 | 5.0 | 5.0 | BD, 50; IP, 50; AN, 100 | 25 | 18 | 70 | 6.99 | | do | N=8.36% |
| 76 | 5.0 | 5.0 | BD, 50; IP, 50; AN, 200 | 19 | 18 | 70 | 9.00 | | Intermediate between rubber and plastics | N=10.32% |
| 77 | 5.0 | 5.0 | BD, 25; IP, 75; AN, 100 | 24 | 18 | 70 | 5.55 | | Rubber | N=9.62% |
| 78 | 5.0 | 5.0 | BD, 50; IP, 50; AN, 100 | CH₂Cl₂ 25 | 18 | 70 | 4.60 | | do | N=8.92% |
| 79 | 5.0 | 7.5 | BD, 100; MA, 100 | 20 | 18 | 70 | 1.94 | 14 | Soft rubber | Calcd.: C, 63.54; H, 8.63. Found: C, 69.33; H, 9.27 (as molar ratio 1:1) |
| 80 | 5.0 | 7.5 | IP, 100; MA, 100 | 19 | 18 | 70 | 2.15 | 14 | do | Calcd.: C, 70.10; H, 9.15 (as molar ratio 1:1). Found: C, 69.94; H, 9.68. |
| 81 | 5.0 | 5.0 | CP, 50; AN, 50 | 32 | 18 | 70 | 5.00 | 70 | Rubber | Calcd.: Cl, 31.5%. Found: Cl, 25.1% |
| 82 | 5.0 | 7.5 | CP, 50; MMA, 50 | 28 | 18 | 70 | 8.35 | 89 | Resin | Calcd.: Cl, 22.05%. Found: Cl, 18.8% |
| 83 | 5.0 | 7.5 | BD, 50; EMA, 50 | 26 | 18 | 60 | 4.2 | 51 | do | Calcd.: C, 71.39; H, 9.59 (as molar ratio 1:1) Found: C, 72.26; H, 9.82. |
| 84 | 5.0 | 7.5 | BD, 100; EMA, 100 | 0 | 18 | 60 | 15.4 | 90 | Rubber like | Calcd.: C, 72.49; H, 9.96 (as molar ratio 1:1). Found: C, 73.20; H, 10.05. |
| 85 | 5.0 | 5.0 | IP, 50; EMA, 50 | 28 | 18 | 60 | 3.22 | 39 | do | Found: C, 70.33; H, 9.92. |
| 86 | 5.0 | 5.0 | IP, 100; EMA, 100 | 0 | 18 | 60 | 13.05 | 70 | Rubber like | |
| 87 | 5.0 | 5.0 | BD, 50; MAn, 50 | 16 | 17 | 70 | 8.17 | 88 | Rubber | |
| 88 | 5.0 | 3.75 | CP, 50; MAn, 50 | 25 | 18 | 70 | 7.20 | 78 | | |
| 89 | 5.0 | 5.0 | CP, 50; DMFA, 50 | 15 | 18 | 70 | 4.88 | 39 | | |
| 90 | 5.0 | 5.0 | IP, 50; MAn, 50 | 25 | 18 | 70 | 4.82 | 58 | | |
| 91 | 5.0 | 5.0 | PD, 50; MAn, 50 | 25 | 18 | 70 | 2.10 | 25 | | |
| 92 | 5.0 | 5.0 | BD, 75; IP, 25; MMA, 100 | 20 | 18 | 70 | 13.85 | 88 | | |
| 93 | 5.0 | 5.0 | PD, 50; IP, 50; MMA, 100 | 20 | 18 | 70 | 13.89 | 86 | | |
| 94 | 5.0 | 5.0 | BD, 25; IP, 75; MMA, 100 | 20 | 18 | 70 | 13.16 | 80 | | |
| 95 | 5.0 | 5.0 | IP, 50; EMA, 50; MMA, 100 | 20 | 18 | 70 | 7.02 | 44 | | O, 9.55%; N, 5.66%. This elementary analysis corresponds to molar ratio of IP:AN:mma =50.4:37.5:12.1. Thus, the ratio of diene to vinyl is almost 1:1. |
| 96 | 5.0 | 5.0 | IP, 100; AN, 50; MMA, 50 | CH₂Cl₂ 22 | 17 | 70 | 5.16 | 37 | | |
| 97 | 5.0 | 5.0 | IP, 100; AN, 80; MMA, 20 | 23 | 17 | 70 | 7.17 | 55 | | O, 5.84%; N, 7.91. This elementary analysis corresponds to molar ratio of IP:AN:MMA =50.4:37.5:12.1 Thus, the ratio of diene to vinyl is almost 1:1. |
| 98 | 5.0 | 5.0 | PD, 100; AN, 100 | 23 | 18 | 70 | 2.39 | 18 | Resin like | |
| 99 | 5.0 | 6.25 | PD, 100; MMA, 100 | 18 | 18 | 70 | 5.69 | 34 | do | |
| 100 | 5.0 | 5.0 | BD, 100; EA, 100 | 20 | 18 | 70 | 1.77 | 12 | Rubber like | |
| 101 | 5.0 | 2.5 | BD, 100; EA, 100 | 22 | 18 | 70 | 1.72 | 10 | do | |
| 102 | 5.0 | 1.25 | BD, 100; BMA, 100 | 19 | 18 | 70 | 12.56 | 64 | Rigid rubber | |
| 103 | 5.0 | 1.25 | IP, 100; BMA, 100 | 18 | 18 | 70 | 11.76 | 56 | Resin like (tacky) | |
| 104 | 5.0 | 1.25 | PD, 100; BMA, 100 | 18 | 18 | 70 | 11.83 | 55 | Rubber like | |
| 105 | 5.0 | 5.0 | IP, 100; MAN, 100 | 25 | 19 | 70 | 7.14 | 59 | do | |
| 106 | 5.0 | 5.0 | IP, 100; MAN, 100 | 15 | 19 | 70 | 5.46 | 45 | do | |
| 107 | 5.0 | 5.0 | BD, 100; BA, 100 | 15 | 19 | 70 | 2.53 | 14 | Rubber like | |
| 108 | 5.0 | 6.5 | IP, 100; BA, 100 | 18 | 19 | 70 | 2.22 | 12 | do | |
| 109 | 5.0 | 5.0 | PD, 100; EA, 100 | 15 | 19 | 70 | 0.86 | 5.1 | | |
| 110 | 5.0 | 5.0 | BD, 50; IP, 50; BMA, 100 | 14 | 16 | 70 | 14.10 | 69 | do | |
| 111 | 5.0 | 5.0 | BD, 7; IP, 25; BMA, 100 | 15 | 16 | 70 | 12.68 | 64 | Rubber | |
| 112 | 5.0 | 5.0 | BD, 25; IP, 75; BMA, 100 | 15 | 16 | 70 | 18.84 | 85 | do | |
| 113 | 5.0 | 5.0 | BD, 50; CP, 50; BMA, 100 | 15 | 16 | 70 | 17.05 | 80 | Rubber | |
| 114 | 5.0 | 5.0 | BD, 50; CP, 50; MMA, 100 | 20 | 16 | 70 | 16.44 | 93 | do | |
| 115 | 5.0 | 5.0 | IP, 25; CP, 50; MMA, 100 | 20 | 16 | 70 | 16.58 | 90 | do | |
| 116 | 5.0 | 5.0 | IP, 50; CP, 50; MMA, 100 | 20 | 16 | 70 | 14.58 | 82 | do | |
| 117 | 5.0 | 2.5 | CP, 100; MAN, 100 | 22 | 16 | 70 | 16.62 | 72 | do | |
| 118 | 5.0 | 2.5 | CP, 100; BA, 100 | 20 | 16 | 70 | 14.16 | 79 | do | |
| 119 | 5.0 | 2.5 | CP, 100; EMA, 50; BMA, 50 | 19 | 16 | 70 | 17.55 | 81 | do | |
| 120 | , 20 | 20 | BD, 280; IB, 200; MMA, 400 | 76 | 20 | 70 | 46.6 | 65 | Resin | A 300 ml. ampule is used. |
| 121 | , 20 | 20 | BD, 200; IB, 280; MMA, 400 | 72 | 20 | 70 | 43.0 | 43 | do | Do. |
| 122 | 5.0 | 5.0 | IP, 20; IB, 80; MMA, 100 | 20 | 18 | 70 | 6.80 | 55 | Resin | C, 63.06; H, 8.82; O, 24.87. |
| 123 | 5.0 | 5.0 | IP, 80; IB, 20; MMA, 100 | 23 | 18 | 70 | 9.01 | 23 | Rubber | C, 66.73; H, 9.44; O, 20.63. |
| 124 | 5.0 | 5.0 | IP, 20; IB, 80; AN, 100 | 23 | 18 | 70 | 2.47 | 23 | Resin | C, 72.83; H, 7.94; N, 11.38. |
| 125 | 5.0 | 5.0 | IP, 60; IB, 40; AN, 100 | 23 | 18 | 70 | 4.62 | 40 | Rubber | C, 70.61; H, 8.66; N, 8.07. |
| 126 | 5.0 | 5.0 | IP, 80; IB, 20; An, 100 | 28 | 18 | 70 | 4.40 | 38 | do | C, 71.15; H, 8.97; N, 8.65. |
| 127 | 200 | 250 | BD, 431 ml.; IB, 462 ml.; AN, 210 ml. | 350 | 18 | 70 | 198 | 37 | | A 3 l. stainless polymerization vessel is used. |

TABLE—Continued

| | Catalyst, mmol | | | | | | | | | |
|---|---|---|---|---|---|---|---|---|---|---|
| | Component A, AlEt₃ | Component B, CCl₃COOH | Monomer (the unit of the numeral is millimole unless otherwise specified) | Solvent ml. (toluene unless otherwise specified) | Reaction time, hr. | Polymerization temp., °C | Yield, g. | Conversion, percent | State | Note |
| 128 | 200 | 250 | BD, 308 ml.; IB, 426 ml.; AN, 560 ml. | 120 | 14 | 70 | 234 | 92 | Resin like | |
| 129 | 5.0 | 5.0 | IP, 50; ST, 50; AN, 100 | 20 | 18 | 70 | 7.52 | 54 | Rubber like | |
| 130 | 5.0 | 5.0 | IP, 80; ST, 20; AN, 100 | 25 | 18 | 70 | 5.60 | 43 | Rubber like | C, 70.94; H, 8.65; O, 24.40. |
| 131 | 5.0 | 5.0 | IP, 50; ST, 50; MMA, 100 | 32.5 | 18 | 70 | 12.80 | 69 | Resin like | C, 68.01; H, 9.40; O, 22.59. |
| 132 | 5.0 | 5.0 | IP, 90; ST, 10; MMA, 100 | 30 | 18 | 70 | 12.73 | 74 | Resin like | |
| 133 | 5.0 | 5.0 | BD, 50; IB, 50; EMA, 100 | 16 | 16 | 70 | 7.91 | 47 | | |
| 134 | 5.0 | 5.0 | BD, 50; IB, 50; BMA, 100 | 18 | 16 | 70 | 14.18 | 72 | | |
| 135 | 2.5 | 2.5 | CP, 50; IB, 50; EMA, 100 | 18 | 16 | 70 | 9.86 | 58 | | |
| 136 | 5.0 | 5.0 | CP, 50; IP, 50; EMA, 100 | 17 | 16 | 70 | 17.77 | 83 | | |
| 137 | 2.5 | 2.5 | CP, 50; IP, 50; BMA, 100 | 20 | 16 | 70 | 5.70 | 44 | Rubber like | |
| 138 | 5.0 | 5.0 | BD, 75; IP, 25; MAN, 100 | 17 | 16 | 70 | 6.95 | 51 | do | |
| 139 | 5.0 | 5.0 | BD, 50; IP, 50; MAN, 100 | 20 | 18 | 70 | 9.95 | 56 | do | |
| 140 | 5.0 | 5.0 | BD, 25; IP, 75; MAN, 100 | 19 | 18 | 70 | 10.48 | 60 | do | |
| 141 | 4.0 | 4.0 | BD, 75; IP, 25; EMA, 100 | 19 | 18 | 70 | 3.62 | 45 | Resin like | |
| 142 | 5.0 | 5.0 | BD, 25; IP, 75; EMA, 100 | 25 | 18 | 70 | 4.10 | 53 | Rubber like | |
| 143 | 7.5 | 7.5 | BD, 37.5; IP, 12.5; EMA, 50 | 25 | 18 | 70 | 8.04 | 65 | | |
| 144 | 5.0 | 5.0 | BD, 50; CP, 50; AN, 100 | 20 | 18 | 70 | 10.03 | 81 | | N, 6.59; Cl, 19.93. |
| 145 | 5.0 | 5.0 | BD, 50; CP, 50; MAN, 100 | 20 | 18 | 70 | 9.70 | 70 | Resin like | O, 13.28; Cl, 16.34. |
| 146 | 5.0 | 5.0 | BD, 50; CP, 50; EMA, 100 | 25 | 18 | 70 | 9.87 | 53 | Rubber like | |
| 147 | 5.0 | 5.0 | BD, 25; CP, 25; MAn, 50 | 22 | 18 | 70 | 6.13 | 61 | Resin like | N, 5.42; Cl, 20.32. |
| 148 | 7.5 | 7.5 | BD, 50; CP, 50; AN, 100 | 22.5 | 18 | 70 | 10.03 | 76 | Rubber like | |
| 149 | 5.0 | 5.0 | IP, 50; CP, 50; MAN, 100 | 17.5 | 18 | 70 | 9.59 | 66 | do | |
| 150 | 5.0 | 5.0 | IP, 50; CP, 50; EMA, 100 | 17.5 | 16 | 70 | 12.80 | 65 | do | |
| 151 | 2.5 | 2.5 | IP, 50; CP, 50; BMA, 100 | 25 | 18 | 70 | 17.5 | 80 | do | |
| 152 | 5.0 | 5.0 | IP, 12.5; CP, 37.5; BMA, 50 | 25 | 18 | 70 | 4.87 | 54 | Resin like | |
| 153 | 5.0 | 5.0 | BD, 100; AN, 50; MAN, 50 | 24 | 18 | 70 | 7.44 | 65 | Rubber-resin like | |
| 154 | 5.0 | 5.0 | BD, 100; AN, 50; EMA, 50 | 22 | 18 | 70 | 8.65 | 63 | Rubber like | N, 4.51; O, 10.61. This result of elementary analysis of copolymer corresponds to molar ratio of BD:AN:EMA = 53:23:24. |
| 155 | 5.0 | 5.0 | BD, 100; AN, 50; BMA, 50 | 20 | 18 | 70 | 8.76 | 58 | Rubber like | N, 4.06; O, 10.45. This result of elementary analysis of copolymer corresponds to molar ratio of BD:AN:BMA = 51:23:26. |
| 156 | 4.0 | 4.0 | BD, 50; AN, 25; MAM, 25 | 22 | 18 | 70 | 2.30 | 36 | Resin like | N, 2.41; O, 26.85. |
| 157 | 5.0 | 5.0 | BD, 100; MAN, 50; MMA, 50 | 20 | 16 | 70 | 6.69 | 49 | Grease like | [η] 0.19; N, 4.83; O, 10.87. This result of elementary analysis of copolymer corresponds to molar ratio of BD:MAN:MMA = 53:24:23. |
| 158 | 5.0 | 5.0 | BD, 100; MAN, 50; EMA, 50 | 20 | 16 | 70 | 6.11 | 42 | Grease like | [η] 0.23; N, 5.48; O, 10.38; This result of elementary analysis of copolymer corresponds to molar ratio of BD:MAN:EMA = 49:28:23. |
| 159 | 5.0 | 5.0 | BD, 100; MAN, 50; BMA, 50 | 20 | 16 | 70 | 8.77 | 55 | do | N, 4.26; O, 12.19. |
| 160 | 5.0 | 5.0 | BD, 100; MAN, 50; MAn, 50 | 17 | 18 | 70 | 5.09 | 37 | Resin like | N, 3.58; O, 25.09. |
| 161 | 4.0 | 4.0 | BD, 50; MAn, 25; MMA, 25 | 22 | 18 | 70 | 4.26 | 46 | do | |
| 162 | 5.0 | 5.0 | BD, 50; MAn, 25; EMA, 25 | 22 | 18 | 70 | 2.72 | 28 | do | |
| 163 | 5.0 | 5.0 | BD, 50; MAn, 25; BMA, 25 | 22 | 18 | 70 | 3.30 | 32 | do | |
| 164 | 4.0 | 4.0 | BD, 100; MMA, 25; EMA, 25 | 18 | 18 | 70 | 12.26 | 76 | Viscous resin like | [η] 0.20. |
| 165 | 5.0 | 5.0 | BD, 100; MMA, 50; EMA, 50 | 17 | 18 | 70 | 14.54 | 83 | do | [η] 0.17. |
| 166 | 5.0 | 5.0 | BD, 100; EMA, 50; BMA, 50 | 20 | 18 | 70 | 12.07 | 66 | do | [η] 0.21. |
| 167 | 5.0 | 5.0 | BD, 100; EMA, 50; MAN, 50 | 23 | 30 | 70 | 4.9 | 38 | Resin like | [η] 0.13. |
| 168 | 5.0 | 5.0 | IP, 100; AN, 50; MMA, 50 | 21 | 18 | 70 | 7.1 | 50 | Rubber like | N, 4.60; O, 9.57. This result of elementary analysis of copolymer corresponds to molar ratio of IP:AN:MMA = 54:24:22. |
| 169 | 5.0 | 5.0 | IP, 100; AN, 50; EMA, 50 | 20 | 30 | 70 | 3.0 | 20 | do | [η] 0.28; N, 4.98; O, 8.60. This result of elementary analysis of copolymer corresponds to molar ratio of IP:AN:EMA = 54:26:20. |
| 170 | 5.0 | 5.0 | IP, 100; AN, 50; BMA, 50 | 19 | 30 | 70 | 10.6 | 64 | Powder | [η] 0.18. |
| 171 | 4.0 | 4.0 | IP, 100; AN, 50; MAn, 50 | 18 | 18 | 70 | 1.5 | 10 | Rubber like | [η] 1.98; O, 22.27. |
| 172 | 5.0 | 5.0 | IP, 100; MAN, 50; MMA, 50 | 20 | 30 | 70 | 7.4 | 49 | | [η] 0.24; N, 4.85; O, 8.78. The result of elementary analysis of copolymer corresponds to molar ratio of IP:MAN:MMA = 52:27:21. |
| 173 | 5.0 | 5.0 | IP, 100; MAN, 50; EMA, 50 | 20 | 30 | 70 | 7.2 | 45 | do | N, 5.29; O, 6.59. |
| 174 | 5.0 | 5.0 | IP, 100; MAN, 50; BMA, 50 | 18 | 18 | 70 | 3.7 | 21 | Rubber like | N, 4.98; O, 7.17. |
| 175 | 4.0 | 4.0 | IP, 100; MAN, 50; Man, 50 | 17 | 18 | 70 | 1.8 | 12 | Rubber like | N, 7.52; O, 5.61. |
| 176 | 5.0 | 4.0 | IP, 100; MAn, 50; MMA, 50 | 16 | 18 | 70 | 1.5 | 9 | Powder | |

TABLE—Continued

| | Catalyst, mmol | | Monomer (the unit of the numeral is millimole unless otherwise specified) | Solvent ml. (toluene unless otherwise specified) | Reaction time, hr. | Polymerization temp., °C. | Yield, g. | Conversion, percent | State | Note |
|---|---|---|---|---|---|---|---|---|---|---|
| | Component A, AlEt$_3$ | Component B, CCl$_3$COOH | | | | | | | | |
| Example: | | | | | | | | | | |
| 177 | 5.0 | 4.0 | IP, 100; MAn, 50; EMA, 50 | 15 | 18 | 70 | 2.2 | 13 | Adhesive rubber-like. | |
| 178 | 5.0 | 4.0 | IP, 100; MAn, 50; BMA, 50 | 13 | 18 | 70 | 4.7 | 25 | ----do---- | |
| 179 | 5.0 | 5.0 | IP, 100; MMA, 50; EMA, 50 | 18 | 18 | 70 | 11.9 | 68 | Rubber like | |
| 180 | 5.0 | 5.0 | IP, 100; MMA, 50; BMA, 50 | 17 | 30 | 70 | 15.8 | 84 | ----do---- | |
| 181 | 5.0 | 5.0 | IP, 100; EMA, 50; BMA, 50 | 16 | 30 | 70 | 12.3 | 62 | ----do---- | |
| 182 | 5.0 | 5.0 | CP, 100; AN, 50; MAn, 50 | 23 | 18 | 70 | 11.28 | 76 | Rubber (a little plastic). | |
| 183 | 5.0 | 5.0 | CP, 100; AN, 50; MMA, 50 | 22 | 18 | 70 | 12.27 | 74 | Rubber like | N, 2.06; O, 7.76; Cl, 28.28. |
| 184 | 5.0 | 5.0 | CP, 100; AN, 50; EMA, 50 | 21 | 18 | 70 | 11.45 | 67 | ----do---- | |
| 185 | 5.0 | 5.0 | CP, 100; AN, 50; BMA, 50 | 20 | 18 | 70 | 12.03 | 65 | ----do---- | |
| 186 | 5.0 | 5.0 | CP, 100; AN, 50; MAn, 50 | 27 | 18 | 70 | 5.43 | 32 | Rubber resin | |
| 187 | 5.0 | 5.0 | CP, 50; MAn, 25; MMA, 25 | 30 | 16 | 70 | 6.11 | 71 | Rubber like | N, 2.16; Cl, 2761; O, 8.06. |
| 188 | 5.0 | 5.0 | CP, 50; MAn, 25; EMA, 25 | 30 | 16 | 70 | 6.06 | 68 | ----do---- | N, 1.42; Cl, 30.48; O, 6.17. |
| 189 | 5.0 | 5.0 | CP, 50; MAn, 25; BMA, 25 | 30 | 16 | 70 | 6.85 | 71 | ----do---- | N, 1.81; Cl, 25.52; O, 8.42. |
| 190 | 5.0 | 5.0 | CP, 50; MAn, 25; MAN, 25 | 28 | 16 | 70 | 2.35 | 28 | ----do---- | N, 1.56; Cl, 27.37; O, 12.48; |
| 191 | 5.0 | 5.0 | CP, 50; MAn, 25; MMA, 25 | 23 | 18 | 70 | 3.29 | 35 | ----do---- | |
| 192 | 5.0 | 5.0 | CP, 50; MAn, 37.5; MMA, 12.5 | 24 | 18 | 70 | 5.41 | 55 | ----do---- | |
| 193 | 4.0 | 4.0 | CP, 50; MAn, 25; DMA, 25 | 22 | 18 | 70 | 2.87 | 30 | ----do---- | |
| 194 | 5.0 | 5.0 | CP, 50; MAn, 37.5; EMA, 12.5 | 21 | 18 | 70 | 4.02 | 42 | ----do---- | |
| 195 | 5.0 | 5.0 | CP, 50; MAn, 25; BMA, 25 | 21 | 18 | 70 | 2.49 | 24 | ----do---- | |
| 196 | 5.0 | 5.0 | CP, 50; MAn, 37.5; BMA, 37.5 | 19 | 18 | 70 | 4.69 | 48 | Rubber resin like | |
| 197 | 5.0 | 5.0 | CP, 50; MAn, 12.5; BMA, 37.5 | 25 | 18 | 70 | 3.74 | 31 | Resin like | |
| 198 | 5.0 | 5.0 | BD, 50; IB, 25; MAn, 100 | 26 | 18 | 70 | 4.05 | 53 | Power | |
| 199 | 4.0 | 5.0 | BD, 12.5; IB, 37.5; MAn, 50 | 26 | 18 | 70 | 5.19 | 68 | ----do---- | |
| 200 | 5.02 | 2.5 | BD, 50; IB, 50; MA, 100 | 24 | 18 | 70 | 1.96 | 14 | Rubber | |
| 201 | 5.0 | 5.0 | BD, 50; C$^9_4$-1, 50; AN, 100 | 24 | 15 | 70 | 3.09 | 29 | Resin like (a little rubber like). | |
| 202 | 5.0 | 5.0 | BD, 50; C$^9_4$-1, 50; MAN, 100 | 23 | 15 | 70 | 2.76 | 22 | Resin like | |
| 203 | 5.0 | 5.0 | BD, 50; C$^9_4$-1, 50; MMA, 100 | 20 | 18 | 70 | 5.68 | 37 | Resin like (a little rubber like). | |
| 204 | 5.0 | 5.0 | BD, 50; C$^9_4$-1, 50 MMA, 100 | 18 | 18 | 70 | 6.91 | 41 | Resin like (a little viscous). | |
| 205 | 5.0 | 5.0 | BD, 50; C$^9_4$-1, 50; BMA, 100 | 15 | 18 | 70 | 9.88 | 50 | Viscous resin like | |
| 206 | 5.0 | 4.0 | BD, 25; C$_4$-1, 25; MAn, 50 | 26 | 18 | 70 | 2.70 | 35 | Resin like | |
| 207 | 5.0 | 5.0 | BD, 50; C$^9_4$-1, 50; MA, 100 | 22 | 18 | 70 | 1.12 | 16 | Rubber resin | |
| 208 | 5.0 | 5.0 | BD, 50; ST, 50; AN, 100 | 20 | 18 | 70 | 9.10 | 62 | Resin like (powder). | |
| 209 | 5.0 | 5.0 | BD, 50; ST, 50; EMA, 100 | 16 | 18 | 70 | 16.40 | 85 | Resin like | |
| 210 | 5.0 | 5.0 | BD, 25; ST, 75; EMA, 100 | 15 | 18 | 70 | 0.90 | 100 | ----do---- | |
| 211 | 5.0 | 5.0 | BD, 50; ST, 50; BMA, 100 | 13 | 18 | 70 | 16.00 | 73 | Rubber like | |

| | Catalyst, mmol | | Monomer (the unit of numeral is millimole unless otherwise specified) | Solvent ml. (toluene unless otherwise specified) | Reaction time, hr. | Polymerization temp. | Yield, g. | Conversion, percent | State or note |
|---|---|---|---|---|---|---|---|---|---|
| | Compound A, AlEt$_3$ | Compound B, CCl$_3$COOH | | | | | | | |
| Example: | | | | | | | | | |
| 212 | 5.0 | 5.0 | BD, 25; ST, 75; BMA, 100 | 12 | 18 | 70 | 20.8 | 89 | Resin like. |
| 213 | 5.0 | 5.0 | BD, 25; ST, 25; BMA, 50 | 24 | 18 | 70 | 9.07 | 100 | Do. |
| 214 | 5.0 | 5.0 | BD, 25; ST, 75; BMA, 100 | 20 | 18 | 70 | 3.97 | 25 | Do. |
| 215 | 5.0 | 5.0 | BD, 50; AN, 100 | 13.5 | 16 | 70 | 4.19 | 37 | 0.327 (MEK); N, 8.68; Cl, 8.68. |
| 216 | 5.0 | 5.0 | BD, 50; VCl, 50; MMA, 100 | 10 | 16 | 70 | 2.73 | 17 | 0.215; O, 23.16; Cl, 2.75. |
| 217 | 5.0 | 5.0 | BD, 50; VCl, 50; EMA, 100 | 10 | 16 | 70 | 2.69 | 15 | 0.214; O, 27.29; Cl, 6.36. |
| 218 | 5.0 | 5.0 | BD, 50; VCl, 50; BMA, 100 | 10 | 16 | 70 | 4.76 | 23 | 0.196; O, 17.90; Cl, 1.55. |
| 219 | 4.0 | 5.0 | BD, 50; VCl, 50; MAn, 100 | 20 | 16 | 70 | 9.93 | 69 | O, 39.89; Cl, 2.34. |
| 220 | 5.0 | 5.0 | BD, 50; VCl, 50; BA, 100 | 10 | 16 | 70 | 2.76 | 15 | 0.536; O, 23.46; Cl, 4.02. |
| 221 | 5.0 | 5.0 | BD, 50; VOAc, 50; AN, 100 | 29 | 16 | 70 | 0.48 | 4 | 0.814 (MEK). |
| 222 | 5.0 | 5.0 | BD, 50; VOAc, 50; MMA, 100 | 25 | 16 | 70 | 1.88 | 11 | 0.316. |
| 223 | 5.0 | 5.0 | BD, 50; VOAc, 50; EMA, 100 | 25 | 16 | 70 | 1.89 | 10 | 0.416; O, 21.60. |
| 224 | 5.0 | 5.0 | BD, 50; VOAc, 50; BMA, 100 | 19.5 | 16 | 70 | 7.24 | 33 | 0.133; O, 20.11. |
| 225 | 2.5 | 2.5 | BD, 50; VOAc, 50; MAn, 100 | 28 | 16 | 70 | 7.60 | 48 | [η] (MEK). |
| 226 | 5.0 | 5.0 | BD, 50; VOAc, 50; BA, 100 | 24 | 16 | 70 | 1.83 | 9 | [η] 0.146. |
| 227 | 5.0 | 5.0 | IP, 50; IB, 60; AN, 100 | 24 | 30 | 70 | 2.2 | 19 | Resin like. |

TABLE—Continued

| Example | Catalyst, mmol Compound A, AlEt₃ | Compound B, CCl₃COOH | Monomer (the unit of numeral is millimole unless otherwise specified) | Solvent ml. (toluene unless otherwise specified) | Reaction time, hr. | Polymerization, temp. | Yield, g. | Conversion, percent | State or note |
|---|---|---|---|---|---|---|---|---|---|
| 228 | 5.0 | 5.0 | IP, 50; IB, 50; MAN, 100 | 22 | 30 | 70 | 4.1 | 32 | Powder. |
| 229 | 5.0 | 5.0 | IP, 50; IB, 50; MMA, 100 | 20 | 18 | 70 | 6.8 | 42 | Resin like. |
| 230 | 5.0 | 5.0 | IP, 50; IB, 50; EMA, 100 | 18 | 30 | 70 | 7.1 | 40 | Do. |
| 231 | 5.0 | 5.0 | IP, 50; IB, 50; EMA, 100 | 18 | 30 | 70 | 7.1 | 40 | Do. |
| 232 | 5.0 | 5.0 | IP, 50; IB, 50; BMA, 100 | 15 | 30 | 70 | 9.2 | 45 | Do. |
| 233 | 5.0 | 5.0 | IP, 50; IB, 50; MAn, 100 | 20 | 18 | 70 | 6.6 | 41 | Do. |
| 234 | 4.0 | 4.0 | IP, 50; IB, 50; MA, 100 | 21 | 30 | 70 | 1.2 | 8 | |
| 235 | 5.0 | 5.0 | IP, 50; C'ı''-1, 50; AN, 100 | 21 | 30 | 70 | 1.7 | 15 | Resin like. |
| 236 | 5.0 | 5.0 | IP, 50; C'ı''-1, 50; MAN, 100 | 22 | 30 | 70 | 3.1 | 24 | Do. |
| 237 | 5.0 | 5.0 | IP, 50; C'ı''-1, 50; MMA, 100 | 20 | 18 | 70 | 9.3 | 57 | Do. |
| 238 | 5.0 | 5.0 | IP, 50; C'ı''-1, 50; EMA, 100 | 20 | 30 | 70 | 8.6 | 49 | Rubber like. |
| 239 | 5.0 | 5.0 | IP, 50; C'ı''-1, 50; BMA, 100 | 15 | 30 | 70 | 12.7 | 62 | Do. |
| 240 | 4.0 | 4.0 | IP, 50; C'ı''-1, 50; MAn, 100 | 21 | 30 | 70 | 2.7 | 18 | Resin like. |
| 241 | 4.0 | 4.0 | IP, 50; C'ı''-1, 50; MA, 100 | 21 | 30 | 70 | 7.0 | 46 | Rubber like. |
| 242 | 5.0 | 5.0 | IP, 50; ST, 50; MAN, 100 | 17 | 18 | 70 | 14.4 | 72 | Resin like. [η]0.14. |
| 243 | 5.0 | 5.0 | IP, 50; ST, 50; MMA, 100 | 13 | 30 | 70 | 16.9 | 74 | Rubber resin like. |
| 244 | 5.0 | 5.0 | IP, 50; ST, 50; EMA, 100 | 19 | 30 | 70 | 12.4 | 67 | Resin like. |
| 245 | 4.0 | 4.0 | IP, 50; ST, 50; BMA, 100 | 20 | 18 | 70 | 11.4 | 66 | Do. |
| 246 | 5.0 | 5.0 | IP, 50; ST, 50; MA, 100 | 25 | 30 | 70 | 4.1 | 32 | Resin like. N, 10,18; Cl, 6.76. |
| 247 | 5.0 | 5.0 | IP, 50; VCl, 50; An, 100 | 25 | 30 | 70 | 4.1 | 31 | Resin like. |
| 248 | 5.0 | 5.0 | IP, 50; VCl, 50; MAN, 100 | 21 | 30 | 70 | 10.8 | 66 | O, 23.18; Resin like. Cl, 5.31. |
| 249 | 5.0 | 5.0 | IP, 50; VCl, 50; MMA, 100 | 19 | 18 | 70 | 8.8 | 49 | Resin like. |
| 250 | 5.0 | 5.0 | IP, 50; VCl, 50; EMA, 100 | 16 | 30 | 70 | 12.0 | 58 | Rubber like. O, 17.32; Cl 3.67 |
| 251 | 4.0 | 4.0 | IP, 50; VCl, 50; BMA, 100 | 15 | 18 | 70 | 1.0 | 6 | Resin like. |
| 252 | 5.0 | 5.0 | IP, 50; VCl, 50; MA, 100 | 23 | 30 | 70 | 2.8 | 19 | Rubber like. O, 19.96; Cl, 6.14. |
| 253 | 2.5 | 2.5 | IP, 50; VOAc, 50; AN, 100 | 46 | 16 | 70 | 2.01 | 15 | Resin like. [η] 0.377. |
| 254 | 5.0 | 5.0 | IP, 50; VOAc, 50; MMA, 100 | 40 | 16 | 70 | 1.08 | 6 | [η] 0.353. |
| 255 | 5.0 | 5.0 | IP, 50; VOAc, 50; EMA, 100 | 38 | 16 | 70 | 1.84 | 9 | [η] 0.352. |
| 256 | 5.0 | 5.0 | IP, 50; VOAc, 50; BMA, 100 | 34 | 16 | 70 | 2.27 | 10 | [η] 0.266. |
| 257 | 2.5 | 2.5 | IP, 50; VOAc, 50; MAn, 100 | 45 | 16 | 70 | 4.20 | 25 | |
| 258 | 7.5 | 7.5 | IP, 50; VOAc, 50; BMA, 100 | 33 | 18 | 70 | 1.55 | 7 | [η] 0.278. |
| 259 | 5.0 | 5.0 | CP, 50; IB, 50; AN, 100 | 24 | 18 | 70 | 6.07 | 48 | Resin like. N, 7.01; Cl, 26.99. |
| 260 | 5.0 | 5.0 | CP, 50; IB, 50; MAN, 100 | 22 | 18 | 70 | 6.16 | 44 | Resin like. |
| 261 | 5.0 | 5.0 | CP, 50; IB, 50; MMA, 100 | 20 | 18 | 70 | 12.71 | 74 | Resin like. O, 18.51; Cl, 15.48. |
| 262 | 5.0 | 5.0 | CP, 25; IB, 25; MAn, 100 | 35 | 15 | 70 | 3.20 | 38 | Do. |
| 263 | 5.0 | 5.0 | CP, 50; IB, 50; MA, 100 | 22 | 15 | 70 | 0.95 | 6 | Rubber resin. O, 7.42; Cl, 32.71. |
| 264 | 5.0 | 5.0 | CP, 50; C'ı''-1, 50; AN, 100 | 24 | 18 | 70 | 5.02 | 40 | Rubber like. N, 11.15; Cl, 1.26. |
| 265 | 5.0 | 5.0 | CP, 50; C'ı''-1, 50; MAN, 100 | 23 | 18 | 70 | 5.95 | 43 | Resin like. |
| 266 | 7.5 | 7.5 | CP, 50; C'ı''-1, 50; MMA, 100 | 18 | 18 | 79 | 9.80 | 57 | Resin like. N, 7.18; Cl, 24.51. |
| 267 | 5.0 | 5.0 | CP, 50; C'ı''-1, 50; EMA, 100 | 18 | 18 | 70 | 12.59 | 68 | Do. |
| 268 | 5.0 | 5.0 | CP, 50; C'ı''-1, 50; BMA, 100 | 15 | 18 | 70 | 16.90 | 78 | Rubber like. |
| 269 | 4.0 | 4.0 | CP, 25; C'ı''-1, 25; MAn, 50 | 25 | 18 | 70 | 3.58 | 42 | Rubber like. |
| 270 | 2.5 | 2.5 | CP, 50; C'ı''-1, 50; MA, 100 | 24 | 18 | 70 | 1.67 | 11 | Rubber resin. |
| 271 | 5.0 | 5.0 | CP, 50; ST, 50; AN, 100 | 22 | 18 | 70 | 9.16 | 62 | Resin like. |
| 272 | 5.0 | 5.0 | CP, 50; ST, 50; MAN, 100 | 20 | 18 | 70 | 5.98 | 37 | Resin like. |
| 273 | 5.0 | 5.0 | CP, 50; ST, 50; MMA, 100 | 19 | 18 | 70 | 18.5 | 95 | Resin like. O, 14.71; Cl, 10.99. This result of elementary analysis of copolymer corresponds to molar ratio of CP:ST:MMA=27:28:45. |
| 274 | 5.0 | 5.0 | CP, 50; ST, 50; EMA, 100 | 16 | 18 | 70 | 19.11 | 91 | Resin like. |
| 275 | 5.0 | 5.0 | CP, 50; ST, 50; BMA, 100 | 13 | 18 | 70 | 17.38 | 73 | Rubber resin like. |
| 276 | 4.0 | 4.0 | CP, 25; SR, 25; MAn, 50 | 24 | 18 | 70 | 6.97 | 72 | Resin like (powder). |
| 277 | 5.0 | 5.0 | CP, 50; ST, 50; MA, 100 | 20 | 18 | 70 | 1.75 | 9.6 | Rubber like. |
| 278 | 5.0 | 5.0 | CP, 50; VCl, 50; AN, 100 | 29 | 16 | 70 | 5.61 | 43.7 | [η]0.256 (MEK). |
| 279 | 5.0 | 5.0 | CP, 50; VCl, 50; MMA, 100 | 23 | 16 | 70 | 7.81 | 43.5 | [η] 0.303. |
| 280 | 5.0 | 5.0 | CP, 50; VCl, 50; EMA, 100 | 20 | 16 | 70 | 6.42 | 53.2 | |
| 281 | 5.0 | 5.0 | CP, 50; VCl, 50; BMA, 100 | 25.5 | 16 | 70 | 10.97 | 49.5 | |
| 282 | 5.0 | 5.0 | CP, 50; VCl, 50; MAn, 100 | 20 | 16 | 70 | 7.76 | 48.0 | |
| 283 | 5.0 | 5.0 | CP, 50; VCl, 50; BA, 100 | 44 | 16 | 70 | 4.30 | 20.7 | [η] 0.374. |
| 284 | 5.0 | 5.0 | CP, 50; VOAc, 50; AN, 100 | 44 | 16 | 70 | 1.59 | 11.2 | [η] 0.76 (MEK). |
| 285 | 7.5 | 7.5 | CP, 50; VOAc, 50; MMA, 100 | 37 | 16 | 70 | 4.63 | 24.0 | [η] 0.21. |
| 286 | 5.0 | 5.0 | CP, 50; VOAc, 50; EMA, 100 | 39 | 16 | 70 | 5.58 | 26.9 | [η] 0.152. |
| 287 | 5.0 | 5.0 | CP, 50; VOAc, 50; BMA, 100 | 35 | 16 | 70 | 8.88 | 37.5 | [η] 0.190. |
| 288 | 4.0 | 4.0 | CP, 50; VOAc, 50; MAn, 100 | 42 | 16 | 70 | 9.15 | 52.2 | |
| 289 | 5.0 | 5.0 | CP, 50; VOAc, 50; BA, 100 | 57 | 16 | 70 | 3.70 | 16.7 | [η] 0.399. |

What is claimed is:

1. A process for producing a copolymer comprising: copolymerizing at least one conjugated diene (D) and at least one conjugated heterodiene (H) in the presence of a catalyst comprising component A of the formula:

$$R^1_a MX^1_b$$

where:

M is an element of Groups II–B, III–A and IV–A of the Periodic Table;

$R^1$ is a member selected from the group consisting of alkyl, cycloalkyl, aryl and aralkyls;

$X^1$ is a member selected from the group consisting of hydrogen, halogen and $OR^{11}$, where $R^{11}$ is a member selected from the group as defined in $R^1$ above; and $a$ and $b$ are positive numbers and one of them may be zero, and the sum of $(a+b)$ is equivalent to the value of valency of the element M;

and component B being an organic compound containing a labile halogen atom of the formula:

$$X^2-\underset{Q^2}{\overset{Q^1}{\underset{|}{\overset{|}{C}}}}-Q^3$$

where:

$X^2$ is halogen or hydrogen;

$Q^1$ and $Q^2$ are similar or dissimilar and are selected from the group consisting of hydrogen, halogen, alkyl, alkenyl, aryl and aralkyl;

$Q^3$ is selected from the group consisting of hydrogen, halogen, alkyl, alkenyl, aryl, aralkyls, $-OR^{21}$, $-SR^{22}$, $-CN$, $-NR^{23}R^{24}$, $-CONR^{25}R^{26}$, $$-\underset{Z^1}{\overset{\|}{C}}-Z^2R^{27}, \quad -\underset{Z^1}{\overset{\|}{C}}-R^{28}$$

(where $Z^1$ and $Z^2$ are similar or dissimilar, and are selected from the group consisting of oxygen and sulfur and where $R^{21}$, $R^{22}$, $R^{23}$, $R^{24}$, $R^{26}$ and $R^{27}$ are selected from the group consisting of hydrogen, alkyl, acycloalkyl, aryl and aralkyl and where $R^{28}$ is halogen or one of the groups as defined in $R^{21}$ above) and alkyl, alkenyl, aryl and aralkyl containing a member of the group consisting of halogen, $OR^{21}$, $SR^{22}$, CN, $NR^{23}R^{24}$, $$\underset{Z^1}{\overset{\|}{C}ONR^{25}R^{26}}, \quad \underset{Z^1}{\overset{\|}{C}}-Z^2R^{27}$$

and $C-R^{28}$ as a substituent.

2. A process as claimed in claim 1 wherein the catalyst consists essentially of components A and B.

3. A process as claimed in claim 2 wherein the conjugated diene (D) is a hydrocarbon or substituted hydrocarbon monomer of 4 to 12 carbon atoms.

4. A process as claimed in claim 3 wherein the conjugated diene (D) is selected from the group consisting of butadiene, isoprene, 1,3-pentadiene, and chloroprene.

5. A process as claimed in claim 2, wherein the conjugated heterodiene (H) is a compound of the formulae:

$$\underset{CH=C-C=O}{\overset{R^3 \ R^4 \ Y}{\underset{|}{|} \ \underset{|}{|} \ \underset{|}{|}}}$$

$$\underset{CH=C-C=S}{\overset{R^5 \ R^6 \ Y}{\underset{|}{|} \ \underset{|}{|} \ \underset{|}{|}}}$$

$$\underset{CH=C-C=N}{\overset{R^7 \ R^8}{\underset{|}{|} \ \underset{|}{|}}}$$

where:

$R^3$, $R^4$, $R^5$, $R^6$, $R^7$ and $R^8$ are similar or dissimilar and are selected from the group consisting of hydrogen, halogen, nitrile, carboxyl, a hydrocarbon group containing 1 to 12 carbon atoms and a substituted hydrocarbon group containing 1 to 12 carbon atoms;

Y is selected from the group consisting of hydrogen, halogen, $OR^{31}$, $SR^{32}$ and $NR^{33}R^{34}$ (where $R^{31}$, $R^{32}$, $R^{33}$ and $R^{34}$ are similar or dissimilar and are selected from the group consisting of hydrogen and a hydrocarbon group containing 1 to 12 carbon atoms) and a hydrocarbon group of 1 to 12 carbon atoms and acid anhydrides of the above-mentioned compounds where these are organic acids.

6. A process as claimed in claim 5, wherein the conjugated heterodiene (H) is selected from the group consisting of acrylonitrile, methacrylonitrile, maleic anhydride, alkyl acrylate, and alkyl methacrylate where the alkyl contains 1 to 12 carbon atoms.

7. A process as claimed in claim 2, wherein M in the formula of catalyst component A is selected from the group consisting of zinc, cadmium, mercury, boron, aluminum, tin and lead;

wherein $R^1$ is the formula of catalyst component A is selected from the group consisting of methyl, ethyl, isopropyl, butyl, cyclohexyl, phenyl and benzyl, and wherein $R^{11}$ is selected from the group consisting of methyl, ethyl, isopropyl, butyl, phenyl and benzyl.

8. A process as claimed in claim 7, wherein the catalyst component A is selected from the group consisting of organoaluminum compound and organoboron compound.

9. A process as claimed in claim 2, wherein catalyst component B is selected from the group consisting of halogenated hydrocarbons, halogenated organic acids, halogenated organic esters, acid halides, halogenated aldehydes, halogenated alcohols and halogenated ethers.

10. A process as claimed in claim 9, wherein the catalyst component B is selected from the group consisting of hologenated acetic acids and its esters, halogenated acetaldehydes, halomethyl substituted aromatic hydrocarbons, t-butyl halides, allyl halides and its derivatives.

11. A process as claimed in claim 2 wherein the catalyst component A is a trialkyl aluminum and the catalyst component B is selected from the group consisting of halogenated acetic acids and halogenated acetic acid esters.

12. A process for producing a copolymer comprising copolymerizing at least one conjugated diene (D), at least one conjugated heterodiene (H), and at least one monoolefin or derivatives thereof (O) in the presence of a catalyst comprising component A of the formula $$R^1_a MX^1_b$$

where:

M is an element of Groups II–B, III–A and IV–A of the Periodic Table;

$R^1$ is a member selected from the group consisting of alkyl, cycloalkyl, aryl and aralkyl;

$X^1$ is a member selected from the group consisting of hydrogen, halogen and $OR^{11}$, where $R^{11}$ is a member selected from the group as defined in $R^1$ above; and $a$ and $b$ are positive numbers and one of them may be zero, and the sum of $(a+b)$ is equivalent to the value of valency of the element M;

and component B being an organic compound containing a labile halogen atom of the formula:

$$X^2-\underset{Q^2}{\overset{Q^1}{\underset{|}{\overset{|}{C}}}}-Q^3$$

where:

$X^2$ is halogen or hydrogen;

$Q^1$ and $Q^2$ are similar or dissimilar and are selected from the group consisting of hydrogen, halogen, alkyl, alkenyl, aryl and aralkyl;

$Q^3$ is selected from the group consisting of hydrogen, halogen, alkyl, alkenyl, aryl, aralkyl, $-OR^{21}$, $-SR^{22}$, $-CN$, $-NR^{23}R^{24}$, $-CONR^{25}R^{26}$,

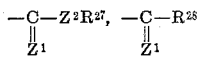

(where $Z^1$ and $Z^2$ are similar or dissimilar, and are selected from the group consisting of oxygen and sulfur and where $R^{21}$, $R^{22}$, $R^{23}$, $R^{24}$, $R^{26}$ and $R^{27}$ are similar or dissimilar and are selected from the group consisting of hydrogen, allyl, cycloalkyl, aryl and aralkyl and where $R^{28}$ is halogen or one of the groups as defined in $R^{21}$ above) and alkyl, alkenyl, aryl and aralkyl containing a member of the group consisting of halogen, $OR^{21}$, $SR^{22}$, CN, $NR^{23}R^{24}$,

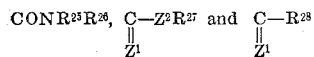

as a substituent.

13. A process as claimed in claim 12, wherein the conjugated diene (D) is a hydrocarbon or substituted hydrocarbon monomer of 4 to 12 carbon atoms.

14. A process as claimed in claim 13, wherein the monomer is selected from the group consisting of butadiene, isoprene, 1,3-pentadiene, and chloroprene.

15. A process as claimed in claim 12, wherein the conjugated heterodiene (H) is a compound of the formulae.

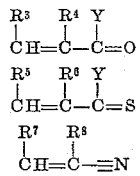

where:

$R^3$, $R^4$, $R^5$, $R^6$, $R^7$ and $R^8$ are similar or dissimilar and are selected from the group consisting of hydrogen, halogen, nitrile, carboxyl, a hydrocarbon group containing 1 to 12 carbon atoms and a substituted hydrocarbon group containing 1 to 12 carbon atoms;

Y is selected from the group consisting of hydrogen, halogen, $OR^{31}$, $SR^{32}$ and $NR^{33}R^{34}$ (where $R^{31}$, $R^{32}$, $R^{33}$ and $R^{34}$ are similar or dissimilar and are selected from the group consisting of hydrogen and a hydrocarbon group containing 1 to 12 carbon atoms) and a hydrocarbon group of 1 to 12 carbon atoms and acid anhydrides of the above-mentioned compounds where these are organic acids.

16. A process as claimed in claim 15, wherein the conjugated heterodiene (H) is selected from the group consisting of acrylonitrile, methacrylonitrile, maleic anhydride, alkyl acrylate, and alkyl methacrylate where the alkyl contains 1 to 12 carbon atoms.

17. A process as claimed in claim 12 in which the monoolefin or derivative thereof (O) is selected from the group consisting of aliphatic olefins, halogen substituted aliphatic olefins, aromatic vinyl compounds, vinyl esters, and vinyl ethers.

18. A process as claimed in claim 17, wherein the monoolefin or derivative thereof (O) is selected from the group consisting of butene-1, isobutene, vinyl chloride, styrene, vinyl acetate.

19. A process as claimed in claim 12, wherein M in the formula of catalyst component A is selected from the group consisting of zinc, cadmium, mercury, boron, aluminum, tin and lead;

wherein $R^1$ is the formula of catalyst component A is selected from the group consisting of methyl, ethyl, isopropyl, butyl, cyclohexyl, phenyl and benzyl, and wherein $R^{11}$ is selected from the group consisting of methyl, ethyl, isopropyl, butyl, phenyl and benzyl.

20. A process as claimed in claim 19, wherein the catalyst component A is selected from the group consisting of organoaluminum compound and organoboron compound.

21. A process as claimed in claim 12, wherein catalyst component B is selected from the group consisting of halogenated hydrocarbons, halogenated organic acids, halogenated organic esters, acid halides, halogenated aldehydes, halogenated alcohols and halogenated ethers.

22. A process as claimed in claim 21, wherein the catalyst component B is selected from the group consisting of halogenated acetic acids and its esters, halogenated acetaldehydes, halomethyl substituted aromatic hydrocarbons, t-butyl halides, allyl halides and its derivatives.

23. A process as claimed in claim 12, wherein the catalyst component A is a trialkyl aluminum and the catalyst component B is selected from the group consisting of halogenated acetic acids and halogenated acetic acid esters.

24. A process as claimed in claim 2 wherein the conjugated diene (D) is selected from the group consisting of butadiene, isoprene, 1,3-pentadiene, and chloroprene, the conjugated heterodiene is selected from the group consisting of acrylonitrile, methacrylonitrile, maleic anhydride, alkyl acrylate, and alkyl methacrylate where the alkyl contains 1 to 12 carbon atoms, M in the formula of catalyst component A is selected from the group consisting of zinc, cadmium, mercury, boron, aluminum, tin and lead; wherein $R^1$ in the formula of catalyst component A is selected from the group consisting of methyl, ethyl, isopropyl, butyl, cyclohexyl, phenyl and benzyl; and wherein $R^{11}$ is selected from the group consisting of methyl, ethyl, isopropyl, butyl, phenyl and benzyl, and catalyst component B is selected from the group consisting of halogenated hydrocarbons, halogenated organic acids, halogenated organic esters, acid halides, halogenated aldehydes, halogenated alcohols and halogenated ethers.

25. A process as claimed in claim 24 wherein the catalyst component B is selected from the group consisting of halogenated acetic acids and its esters, halogenated acetaldehydes, halomethyl substituted aromatic hydrocarbons, t-butyl halides, allyl halides and its derivatives.

26. A process as claimed in claim 24 wherein the catalyst component A is a trialkyl aluminum and the catalyst component B is selected from the group consisting of halogenated acetic acids and halogenated acetic acid esters.

27. A process as claimed in claim 24 wherein the catalyst component A is triethylaluminum and the catalyst component B is trichloroacetic acid.

28. A process as claimed in claim 12 wherein the catalyst consists essentially of components A and B.

29. A process as claimed in claim 28 wherein the conjugated diene(s) is selected from the group consisting of butadiene, isoprene, 1,3-pentadiene, and chloroprene, the conjugated heterodiene (H) is selected from the group consisting of acrylonitrile, methacrylonitrile, maleic anhydride, alkyl acrylate, and alkyl methacrylate where the alkyl contains 1 to 12 carbon atoms, the monoolefin or derivative thereof (O) is selected from the group consisting of butene -1, isobutene, vinyl chloride, styrene, and vinyl acetate, M in the formula of catalyst component A is selected from the group consisting of zinc, cadmium, mercury, boron, aluminum, tin and lead; wherein $R^1$ in the formula of catalyst component A is selected from the group consisting of methyl, ethyl, isopropyl, butyl, cyclohexyl, phenyl and benzyl, and wherein $R^{11}$ is selected from the group consisting of methyl, ethyl, isopropyl, butyl, phenyl and benzyl and catalyst component B is selected from the group consisting of halogenated hydrocarbons, halogenated organic acids, halogenated organic esters, acid halides, halogenated aldehydes, halogenated alcohols and halogenated ethers.

30. A process as claimed in claim 29 wherein the catalyst component B is selected from the group consisting of halogenated acetic acids and its esters, halogenated acetaldehydes, halomethyl substituted aromatic hydrocarbons, t-butyl halides, allyl halides and its derivatives.

31. A process as claimed in claim 29 wherein the catalyst component A is a trialkyl aluminum and the catalyst component B is selected from the group consisting of halogenated acetic acids and halogenated acetic acid esters.

32. A process as claimed in claim 29 wherein the catalyst component A is triethylaluminum and the catalyst component B is trichloroacetic acid.

References Cited
UNITED STATES PATENTS

| | | | |
|---|---|---|---|
| 3,278,508 | 10/1966 | Kahle et al. | 260—94.3 |
| 3,429,829 | 2/1969 | Kahle | 252—431 |
| 3,432,513 | 3/1969 | Miller et al. | 260—93.7 |
| 3,448,095 | 6/1969 | Dawans et al. | 260—94.3 |
| 3,462,403 | 8/1969 | Pendelton | 260—93.7 |
| 3,483,174 | 12/1969 | Libengood et al. | 260—83.5 |
| 3,491,068 | 1/1970 | Gaylord | 260—78.5 |
| 3,060,155 | 10/1962 | Reinhard | 260—78.5 |
| 2,967,174 | 1/1961 | Bartl | 260—78.5 |
| 3,607,842 | 9/1971 | Parris et al. | 260—78.5 |

JOSEPH L. SCHAFER, Primary Examiner

J. KIGHT III, Assistant Examiner

U.S. Cl. X.R.

252—431 R; 260—63 BB, HA, 78.5 R, 79.7, 80.3 R, N, 80.7, 82.1, 82.3, 82.5, 83.5, 84.1, 85.3 R, 85.5 A, HC, M, L, 85.7, 86.1 R, 86.3, 86.7, 87.5 C